US006352241B1

(12) United States Patent
Hannewald et al.

(10) Patent No.: US 6,352,241 B1
(45) Date of Patent: Mar. 5, 2002

(54) BUTTERFLY VALVE BODY

(75) Inventors: Thomas Hannewald, Griesheim; Armin Seeger, Bad Soden; Wilhelm Bock, Bad Hersfeld, all of (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/601,016

(22) PCT Filed: Nov. 19, 1999

(86) PCT No.: PCT/EP99/08884

§ 371 Date: Sep. 8, 2000

§ 102(e) Date: Sep. 8, 2000

(87) PCT Pub. No.: WO00/31396

PCT Pub. Date: Jun. 2, 2000

(30) Foreign Application Priority Data

Nov. 26, 1998 (DE) ........................................ 198 54 595

(51) Int. Cl.[7] ............................ F16K 31/02; F16K 1/22
(52) U.S. Cl. .................................. 251/129.11; 251/305
(58) Field of Search ........................... 251/129.11, 305, 251/366

(56) References Cited

U.S. PATENT DOCUMENTS 3,877,678 A * 4/1975 Jung .......................... 251/305
3,958,595 A * 5/1976 Al et al. ..................... 137/375
5,111,775 A * 5/1992 Sumida et al. ............. 123/41.1
5,265,574 A * 11/1993 Kadomukai et al. ........ 123/396
5,374,031 A * 12/1994 Semence et al. ............ 251/305
5,876,015 A * 3/1999 Schaeffer et al. ........... 251/305

FOREIGN PATENT DOCUMENTS

| | | |
|---|---|---|
| DE | 4126366 | 2/1993 |
| DE | 4234460 | 4/1994 |
| DE | 4334180 | 4/1995 |
| DE | 19604009 | 8/1996 |
| DE | 19516584 | 11/1996 |
| DE | 19744330 | 4/1998 |
| FR | 2575518 | 7/1986 |
| FR | 2663710 | 12/1991 |
| FR | 2762374 | 10/1998 |

* cited by examiner

*Primary Examiner*—David A. Scherbel
*Assistant Examiner*—David Austin Bonderer
(74) *Attorney, Agent, or Firm*—Martin A. Farber

(57) ABSTRACT

A throttle body (1) which has a throttle housing (2) made of plastic, a throttle butterfly (5) being pivotably mounted in a conduit section (3) of the throttle housing (2), wherein, a metal cylinder (12) is provided in the conduit section (3) over at least part of the pivoting range of the throttle butterfly (5).

13 Claims, 7 Drawing Sheets

BUTTERFLY VALVE BODY

FEILD BACKGROUND OF THE INVENTION

The invention relates to a throttle body with a throttle housing made of plastic 1.

Throttle housings of throttle bodies are generally made from aluminum by die casting. However, this has the disadvantage that involved and careful machining of the die casting is required, and there is also the fact that such throttle housings are heavy and have poor corrosion resistance.

Consideration has therefore already been given to producing the throttle housing from plastic by injection molding. Such throttle housings made of plastic have the advantage that they are lighter than aluminum housings, that the production material is less expensive and that inserts, for bearings for example, can be press-fitted in openings formed during the injection-molding process, thus making it either completely unnecessary to machine the molding or significantly reducing the amount of machining required.

However, throttle housings made from plastic have the disadvantage that they may shrink during and after the injection-molding process and may deform after being released from the mold. The same applies to the effects of temperature and forces, especially since such throttle bodies are arranged in the engine compartment of vehicles, where they are subject to very large fluctuations in temperature. If, for example, the engine of the vehicle is not in operation and the outside temperature is low, very low temperatures are reached (e.g. temperatures around freezing point or even below); when the internal combustion engine is operating, on the other hand, a very high temperature (in particular over 100 C.) is reached. Due, in particular, to these large temperature fluctuations, disadvantageous deformations therefore occur in the pivoting rang e of the throttle butterfly, making it impossible to meet the high leakage-air requirements, particularly in the idle position of the throttle butterfly and around the latter. However, it is precisely this range that is particularly important since it exerts a major effect on fuel consumption and the quality of the exhaust gas. It is therefore particularly important that the intake wall of the throttle body should maintain its dimensional accuracy, both under the conditions mentioned and over a prolonged period, in particular a number of years.

DE 43 34 180A1 has therefore already proposed embedding an annular insert into the plastic throttle body, transversely to the intake duct, this insert having angled lugs through which the throttle shaft projects, and the lugs resting by a respective lug surface facing away from the throttle butterfly against a bearing end face of the bearing devices, the said end face facing the throttle butterfly. First of all, this annular insert has the disadvantage, owing to its geometrical design, that it is expensive to manufacture, particularly during the series production of throttle bodies.

However, the essential disadvantage is that the annular insert is completely surrounded by plastic after the injection-molding process and the throttle butterfly thus once more has a large-area internal intake-wall contour made of plastic in its pivoting range. Due to the high requirements as regards protection of the environment (quality of the exhaust gas) and fuel consumption, the required dimensional accuracy is still not guaranteed, even if it is somewhat better, allowing the plastic intake wall to deform, contract and expand despite the annular insert, with the result that the high leakage-air requirements are, as before, not met.

SUMMARY OF THE INVENTION

The underlying object of the invention is therefore to improve a throttle body of this kind further so that the requirements made as regards the quality of the exhaust gas and fuel consumption are met but, at the same time, that requirements as regards a uniform response of the internal combustion engine to depression of the accelerator pedal are met. At the same time, the advantages of a plastic throttle body should not be abandoned.

According to the invention, a metal cylinder is provided in the conduit section over at least part of the pivoting range of the throttle butterfly.

Owing to the stability of a metal cylinder, the throttle butterfly is always presented, at least in the relevant part of the pivoting range, with a precisely defined and dimensionally accurate inner wall which changes only negligibly, if at all, in the case of temperature fluctuations and over a prolonged period, and the required dimensional accuracy is thus ensured. The metal cylinder can be inserted into the injection mold and then surrounded with plastic in such a way that its inner wall remains free, thus presenting a metal surface to the throttle butterfly. As an alternative, it is also possible to produce the throttle housing from plastic first and then to insert the metal cylinder. It is also conceivable to produce the metal cylinder from a number of parts, it being possible, for example, for two halves to abut in the plane in which the throttle shaft is situated. It would also be conceivable to cover the inner wall of the metal cylinder with a thin protective layer (composed, for example, of the same plastic of which the throttle housing is composed), the thickness of which has no effect on dimensional accuracy. Such a protective layer is an effective means of preventing the deposition of troublesome particles on the inner wall.

As a development of the invention, the metal cylinder is provided below and/or above the throttle shaft carrying the throttle butterfly, in the direction of flow. It is precisely the area around the plane in which the throttle shaft is arranged that is particularly important since this is the area used to set the idling speed with the throttle butterfly. It is therefore particularly in this area that good dimensional accuracy is required, and this is achieved with the metal cylinder. However, it is also possible for the metal cylinder to extend over a larger pivoting range of the throttle butterfly and, if appropriate, even further.

As a development of the invention, the metal cylinder is formed to hold the bearings for the throttle shaft. This ensures a further increase in strength, thereby also simplifying the production process. The metal cylinder can be produced first and then be provided with the bearings for the throttle butterfly and subsequently surrounded with plastic by molding. Another advantage is to be seen in the fact that different metal cylinders (in particular cylinders of different length and/or different diameter) can be inserted into the same mold for the throttle housing, thereby making it possible to reduce the number of components, in particular the number of molds for the throttle housing.

As a development of the invention, the metal cylinder is also formed to hold further elements of the throttle body, such as elements to hold a throttle-valve potentiometer or a drive motor. Further elements of the throttle body can also include shafts for a gear by means of which the throttle shaft is driven by an electric motor. The metal cylinder can also be provided with holes at which the additional elements, such as a carrier plate for the throttle-valve potentiometer, are screwed on after the production of the throttle housing. The metal cylinder can likewise have stops, for an end position of the throttle butterfly or the throttle butterfly for example.

As a development of the invention, the metal cylinder has an internal contour for the purpose of obtaining a predeterminable characteristic curve for the volume flow as a function of the pivoting of the throttle butterfly. By producing a corresponding metal cylinder from die-cast aluminum or magnesium, for example (other materials and production methods also being possible) and any subsequent machining that may be necessary, the inner contour of the metal cylinder makes it possible to achieve a characteristic curve for the volume flow through the conduit section which is established as a function of the pivoting of the throttle butterfly. An inner contour can, for example, have the effect that virtually no volume flow, if any, takes place through the conduit section in the closed position of the throttle butterfly. In one end position, referred to thus far as the closed position, the conduit section does not necessarily have to be completely closed. Instead, this end position can also be a minimum position, in which a defined leakage air quantity flows through the conduit section. As the throttle butterfly is pivoted further out of the closed position or minimum position, the volume flow increases in a manner dependent on the inner contour used, up to a further end position which, in particular, represents full opening of the conduit section.

In summary, therefore, it can be stated that the advantages of a throttle housing made of plastic (such as low weight and the low cost of materials) are retained by the invention but that the disadvantages with a throttle housing made of plastic, such as inadequate dimensional accuracy, are eliminated by the use of the metal cylinder, allowing the desired characteristic curve to be reliably set and maintained, even in the case of temperature fluctuations and over a long period of time (several years).

The throttle body according to the invention can be what is referred to as a coupled system, in which the throttle butterfly is connected for the power demand to an accelerator pedal via connecting elements such as Bowden cables or the like. It is likewise conceivable in such systems to perform superimposed regulation (in particular idle-speed regulation) in parts of the range (in particular in the idle-speed range) by means of an actuating drive (in particular an electric motor). The throttle body can equally well be employed in so-called drive-by-wire systems, in which the power demand (e.g. actuation of an accelerator pedal) is converted into electrical signals, the signals being fed to a control unit which, in turn, activates an actuating drive which then adjusts the throttle butterfly at least as a function of the power demand and, if appropriate, of further parameters.

DESCRIPTION OF THE DRAWING

The present invention will be explained accompanying drawing using a throttle body as an example, this area of application being regarded as the preferred one; however, the present invention is not restricted to this illustrative embodiment but can also be employed in a corresponding manner, with slight modifications as appropriate, in other areas of application.

In the Figures of the drawings.

DETAILED DESCRIPTION OF THE PREFERRED EMBODIMENT

Figure 1:
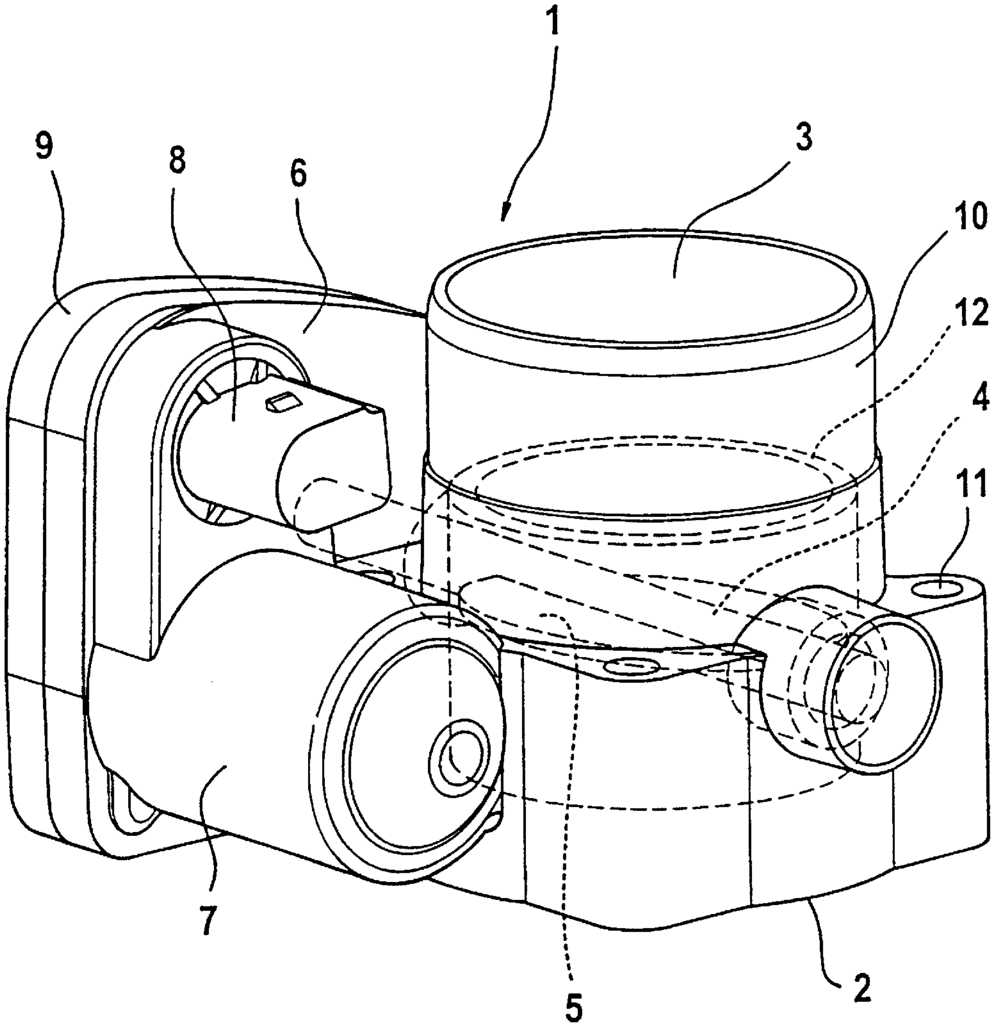
FIG. 1 shows a throttle body in three-dimensional sectional representation.

FIG. 1 shows a throttle body 1 in three-dimensional sectional representation. Such throttle bodies are used to feed air or a fuel/air mixture to the injection device of an internal combustion engine, in particular for a vehicle. For this purpose, the throttle body 1 has a throttle housing 2 manufactured from plastic, in particular by an injection-molding method. In this throttle housing 2 there is a conduit section 3 via which the air or fuel/air mixture is fed to the injection device (not shown). In order to adjust the volume to be supplied, a throttle butterfly 5 is arranged on a throttle shaft 4, rotation of the throttle shaft 4 causing the throttle butterfly 5 to pivot as well and increasing or reducing the cross section of the conduit section 3 to a greater or lesser extent and thus regulating the volume flow.

In a simple embodiment of the throttle body 1, one end of the throttle shaft 4 is connected, for example, to a cable pulley, this cable pulley being connected in turn, via a Bowden cable, to an adjusting device for a power demand, this adjusting device being, for example, the accelerator pedal of a vehicle, so that the throttle butterfly 5 can be moved from a position of minimum opening, in particular a closed position, into a position of maximum opening by actuation of this adjusting device by the driver of a vehicle, thus enabling the power output of the internal combustion engine to be adjusted.

The throttle body 1 shown in FIG. 1 is a throttle body in which the throttle butterfly 5 can either be adjusted by an actuating drive in a part range, for example the idling range, and otherwise by means of the accelerator pedal or in which the throttle butterfly 5 can be adjusted by an actuating drive over the entire range of adjustment. In these "electronic accelerator" or "drive-by-wire" systems, the power demand is converted into an electrical signal by pressing down the accelerator pedal, for example, this signal being fed to a control unit which then generates a drive signal for the actuating drive. This means that there is no mechanical connection between the desired-value input (accelerator pedal) and the throttle butterfly 5 in these known systems.

The throttle housing 2 of the throttle body 1 therefore has a gear housing 6 and a actuating drive housing 7, the throttle housing 2, the gear housing 6 and the actuating drive housing 7 in a preferred embodiment forming a one-piece unit and being produced in the same production step. An arrangement in which the individual housings can be assembled is also conceivable. An electric motor designed as an actuating drive (not shown in FIG. 1) is accommodated in the actuating drive housing 7 and acts via a reduction gear (likewise not shown in FIG. 1) on the throttle shaft 4, the throttle butterfly 5 thus being pivoted by activating the electric motor. The electric motor is activated via a plug 8 arranged in the gear housing 6, the throttle body 1 being connected to a control unit via the plug 8. Feedback on the respective position of the throttle butterfly 5 is also passed to the control unit via the plug 8, this control unit regulating the electric motor by comparison of the desired value (accelerator pedal) and the actual value for the position of the throttle butterfly 5 until the difference between the desired value and the actual value is equal to zero. The actual position of the throttle butterfly 5 can be recorded by means of an appropriate sensor, in particular a so-called throttle-valve potentiometer, in which the slider of the potentiometer is connected to the throttle shaft 4.

The gear housing 6 including the actuating drive housing 7 is closed by a housing cover 9. The configuration and mounting of the housing cover 9 will be described in detail with reference to FIGS. 2 and 3.

In general, the throttle body 1 is arranged in an intake system of the internal combustion engine and is installed as a module, for which purpose the throttle body 1 shown in FIG. 1 has a flange 10 by means of which it can be connected to an intake-air filter via an intake line (not shown) or is connected directly to this intake-air filter. To allow the throttle body 1 to be fastened to the injection device on the side remote from the flange 10, holes 11 are provided and, by means of these, the throttle body 1 can be screwed in a sealing manner to the injection device. The manner of fastening is illustrative only and is not essential to the invention.

A metal cylinder 12 shown in dashes is furthermore arranged in the conduit section 3 in the three-dimensional sectional representation of the throttle body 1. The outer circumferential surface of the metal cylinder 12 is completely surrounded by the plastic of the throttle housing 2, the metal inner wall of the metal cylinder extending over the pivoting range of the throttle butterfly 5 or, if required, over slightly less or slightly more than this pivoting range. Various configurations of the metal cylinder 12 can be seen in the following figures.

Figure 2:
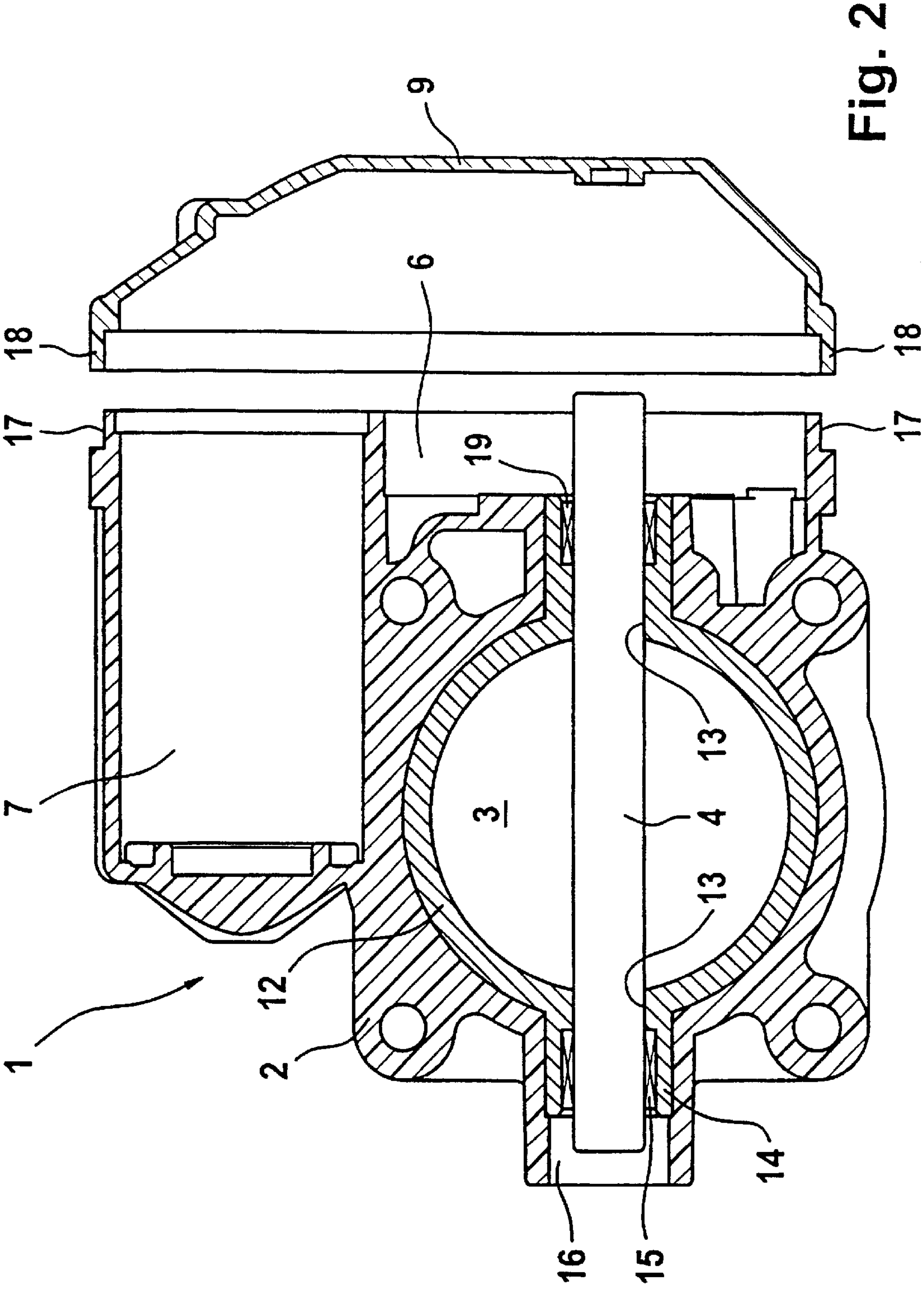
FIG. 2 shows the throttle body in accordance with FIG. 1 in cross section with the cover removed.

FIG. 2 shows the throttle body 1 of FIG. 1 in section with the housing cover 9 removed. The position of the metal cylinder 12 is clearly visible in this cross section, one simple form of this cylinder being a piece of tube with passages 13 for the throttle shaft 4. The inner wall of the metal cylinder 12 can be shaped by machining to enable specified characteristic curves for the volume flow through the conduit section 3 as a function of the position of the throttle butterfly 5 to be set. FIG. 2 shows a configuration of the metal cylinder 12 in which the metal cylinder 12 has an extension 14 in the region of each of be passages 13, these extensions 14 accommodating bearings 15, 19 for the throttle shaft 4. This increases ease of assembly since, once the metal cylinder 12 has been encapsulated with plastic to form the overall throttle housing 2, the bearings for the throttle shaft 4 are already present as well. On the left-hand side when viewed in FIG. 2, the throttle shaft 4 ends in a space 16 in which so-called return springs and emergency-running springs can be accommodated, for example. The return spring preloads the throttle shaft 4 in the closing direction, with the result that the actuating drive acts against the force of this return spring. A so-called emergency-running spring has the effect of moving the throttle butterfly 5 into a defined position if the actuating drive fails, this position generally being somewhat above that for the idling speed. As an alternative or in addition to this, it is also possible for the throttle shaft 4 to project out of the throttle housing 2 beyond the space 16, in which case this end of the throttle shaft 4 has, for example, a cable pulley mounted on it, this being connected to an accelerator pedal by a Bowden cable, thus providing a mechanical desired-value input. The end of the extension 14 (its end face) remote from the space 16 can be used to accept additional elements, e.g. for fixing a carrier plate of the throttle-valve potentiometer. The end face of this extension 14 or other extensions whose end faces project into the gear housing 6 can likewise be used to accept additional elements, e.g. stub shafts for gearwheels or segment gears belonging to the gear (not shown).

The throttle housing 2 furthermore has a peripheral flat 17 facing in the direction of the housing cover 9, the said flat corresponding to a peripheral web on the housing cover 9. Previously, the housing cover 9 was connected to the throttle housing 2 by screwing or by means of clip-type joints, with a seal in between. This meant a high outlay since corresponding features had to be provided when producing the die for the throttle housing 2 and the housing cover 9. The presence of the seal also meant that there was another component and hence the insertion of the seal meant another assembly step, something which proved disadvantageous particularly in series production of throttle bodies. The peripheral flat 17 on the throttle housing 2 and the peripheral web 18 on the housing cover 9 (or vice versa), which can be provided at as early a stage as the production of the die for the throttle housing 2 and the housing cover 9 from plastic, first of all ensures that, once the housing cover 9 has been mounted, a defined position on the throttle housing 2 is achieved, possibly with slight play.

Figure 3:
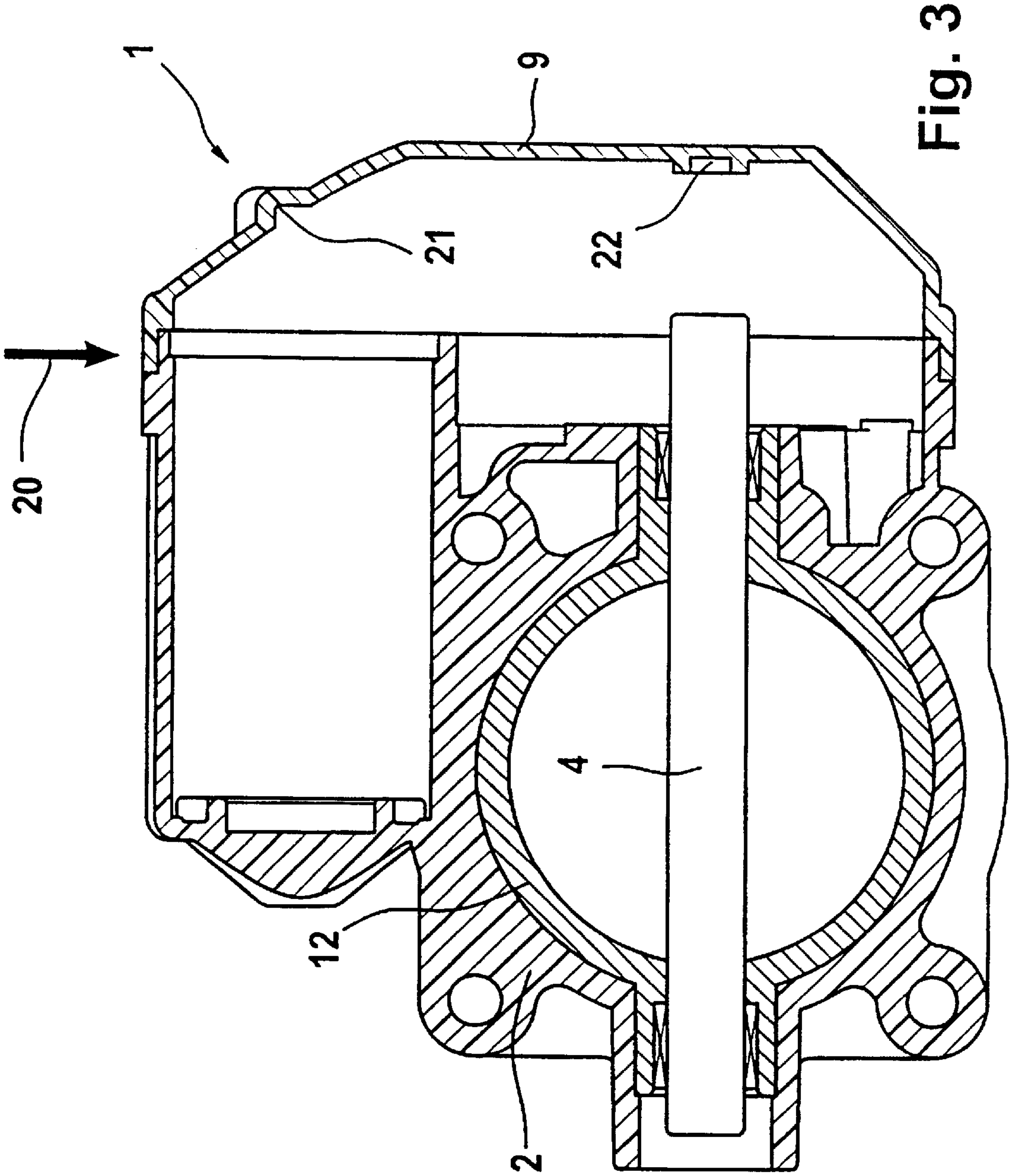
FIG. 3 shows the throttle body in accordance with FIG. 1 in cross section with the cover on, FIG. 4 shows the throttle body in longitudinal section in accordance with FIG. 1.

FIG. 3 shows the throttle body 1 of FIG. 1 in cross section with the housing cover 9 fitted. Here, the web 18 lies all the way round over the flat 17, the two features thus overlapping. A laser beam 20 is now directed all the way round at this area of overlap, the laser beam being aligned in such a way and its intensity being chosen in such a way that the two mutually facing surfaces of the flat 17 and the web 18 heat up and begin to melt. As a result, the throttle housing 2 fuses all the way round with the housing cover 9 at this location, with the result that the actuating drive housing 7 and the gear housing 6 situated under the housing cover 9 are closed in a sealing manner. The insertion and fitting of a seal can be omitted. The housing cover 9 is nonreleasably connected to the throttle housing 2, i.e. it cannot be removed from the throttle housing 2 without destroying the components involved. Apart from absolute leaktightness, this has the advantage that all the components that are arranged in these spaces are protected from unauthorized interference. This is advantageous particularly when an electronic control unit is accommodated in the throttle housing 2, covered by the housing cover 9.

The housing cover 9 shown in FIG. 3 also has a reaction bearing 21, by means of which the drive shaft of the electric motor (not shown) is supported. In the same way, the throttle shaft 4 can also be provided with reaction support by means of a reaction bearing 22.

Figure 4:
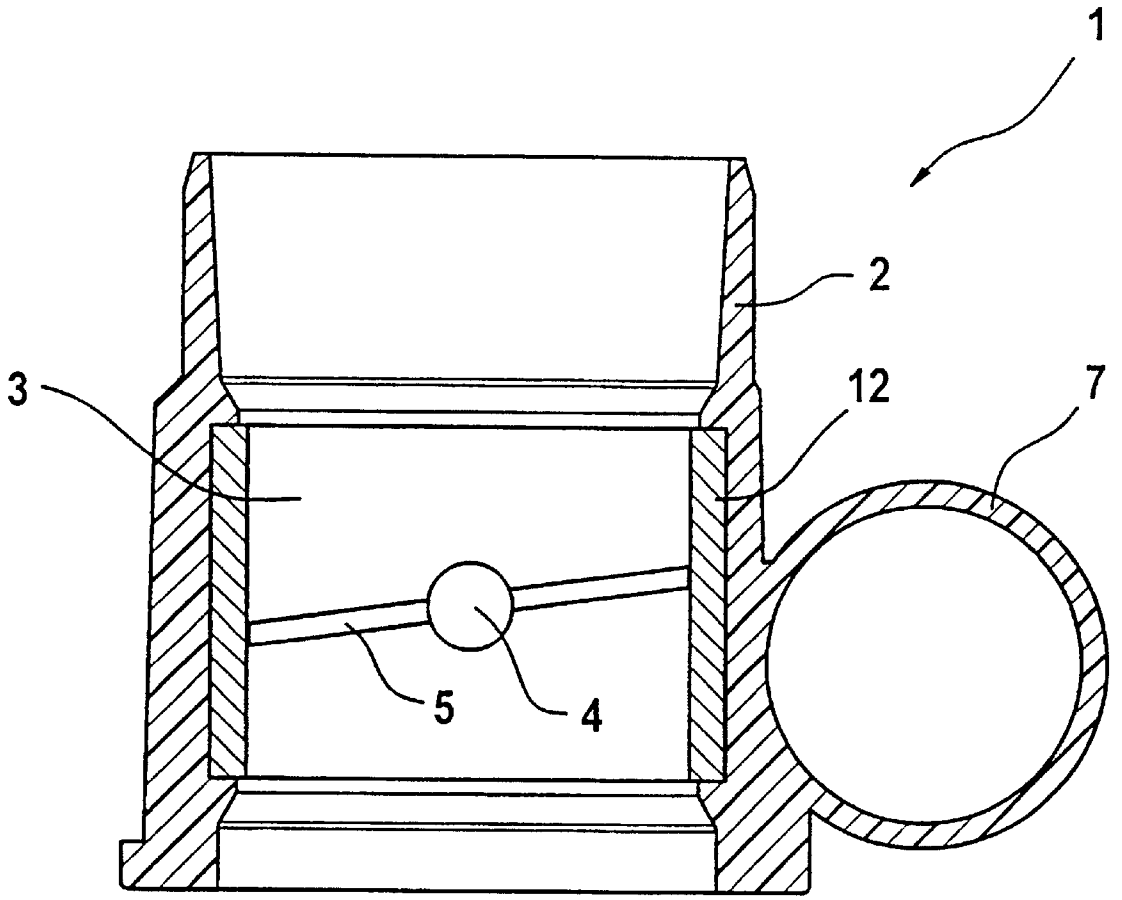
Figure 7:
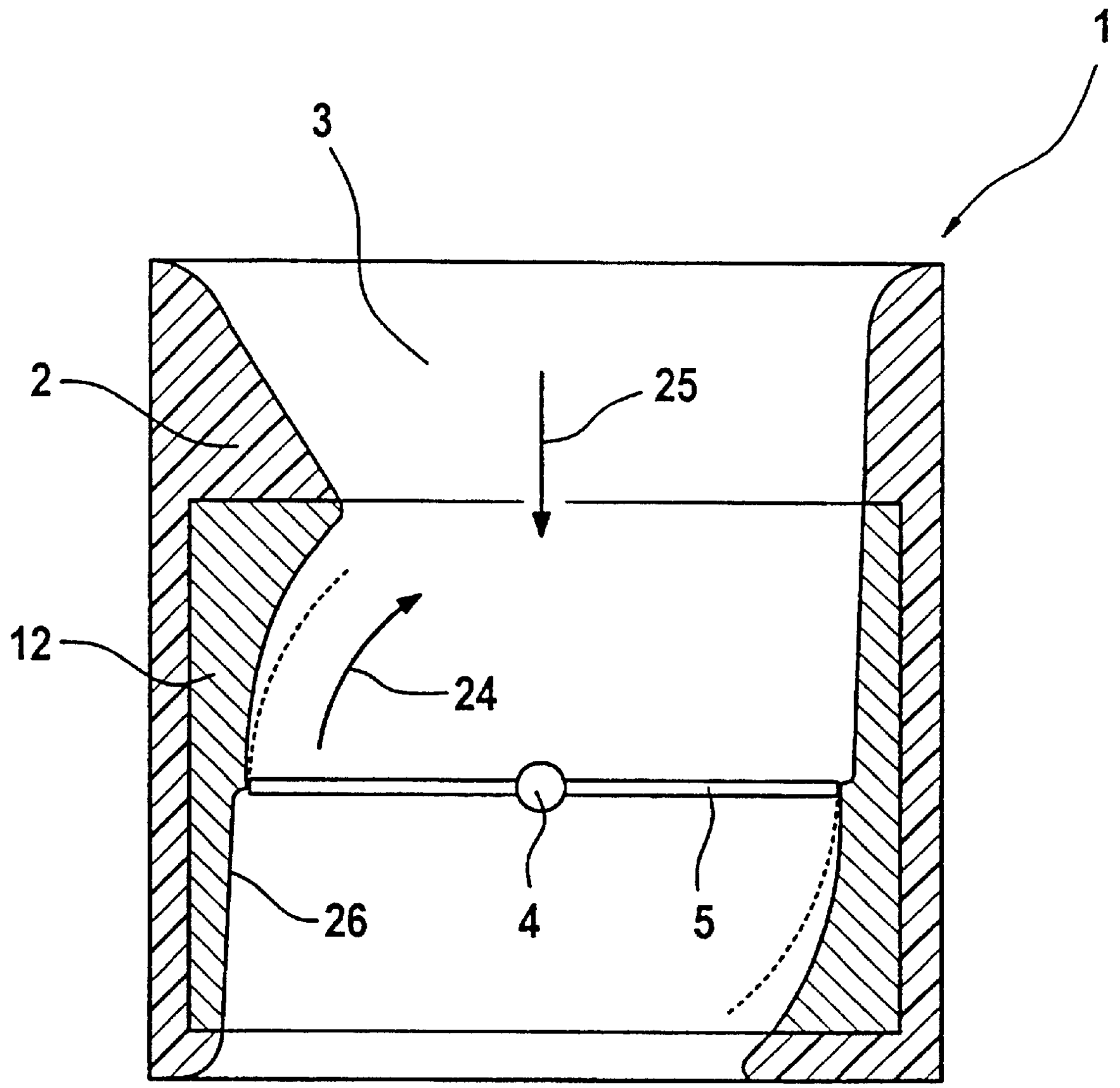
FIG. 7 shows the throttle body in longitudinal section in accordance with FIG. 1, with a metal cylinder having a contoured interior.

FIG. 4 shows the throttle body 1 of FIG. 1 in longitudinal section. It can be seen here that the metal cylinder 12 is designed as a simple cylinder whose outer circumferential surface and at least part of the end faces are surrounded by the plastic of the throttle housing 2. The inward-facing inner wall of the metal cylinder 12 is of rectilinear design but could also be shaped to obtain specifiable characteristic curves for the volume flow. Such configurations are shown in FIG. 7, for example. In FIG. 4, the throttle butterfly 5 is shown in its closed position, and it can be moved into an open position by pivoting it counterclockwise, a rotation through about 90°(i.e. into an approximately vertical position when viewed in FIG. 4) corresponding to the full-load position.

Figure 5:
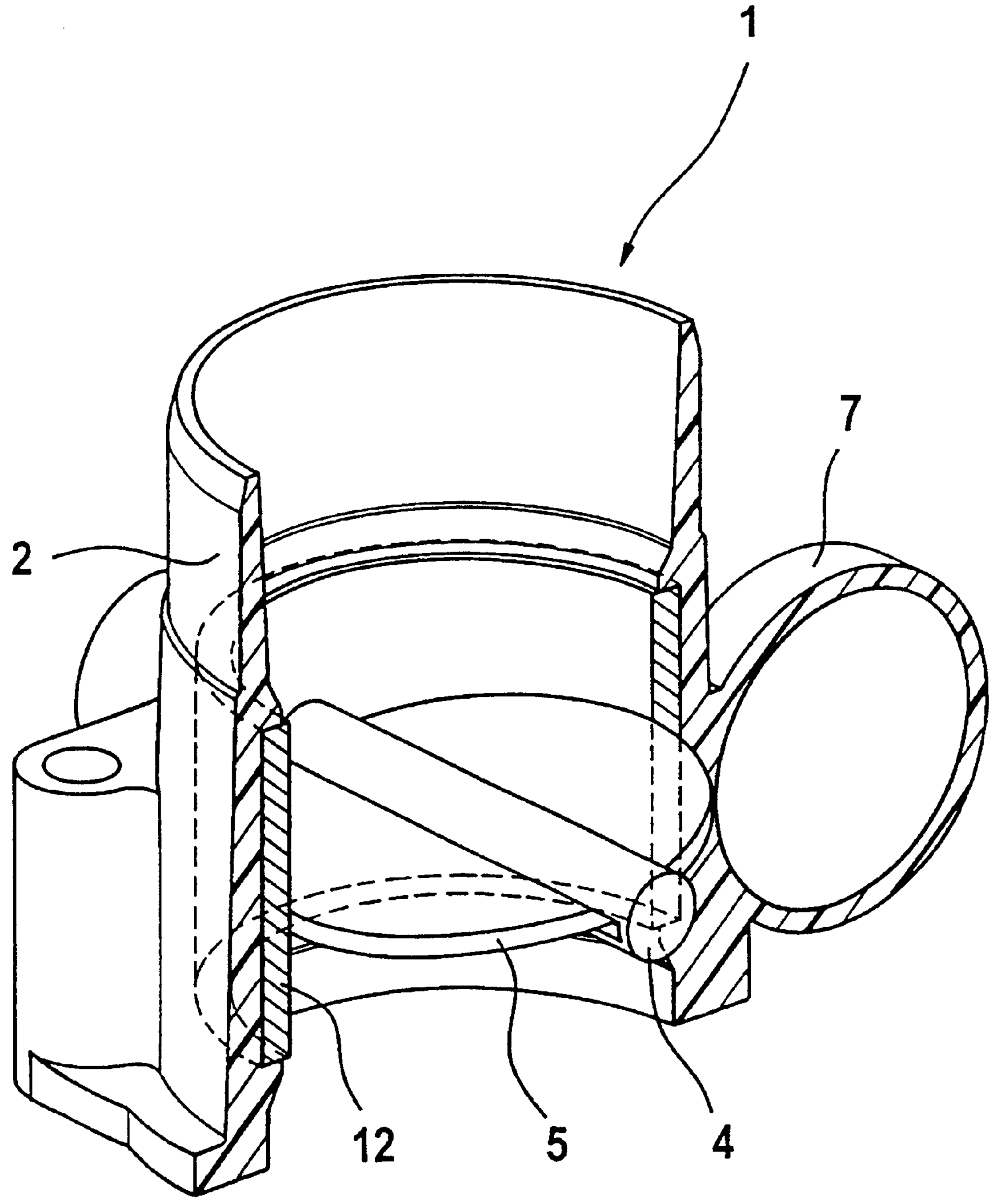
FIG. 5 shows the throttle body in accordance with FIG. 1 in sectioned, three-dimensional view.

FIG. 5 shows the throttle body 1 of FIG. 1 in a sectioned three-dimensional view, the arrangement of the metal cylinder 12 in the throttle housing 2 again being visible. Also visible is one way of mounting the throttle butterfly 5 on the throttle shaft 4. The throttle shaft 4 has a slot into which the throttle butterfly 5 can be inserted, the throttle butterfly 5, once having been aligned, being fixed immovably in its required position on the throttle shaft 4. This can be performed, for example, by pins or screws inserted through the throttle shaft 4 and the throttle butterfly 5. As an alternative, it is also possible for the throttle butterfly 5 to be calked or bonded to the throttle shaft 4 in the slot.

Figure 6:
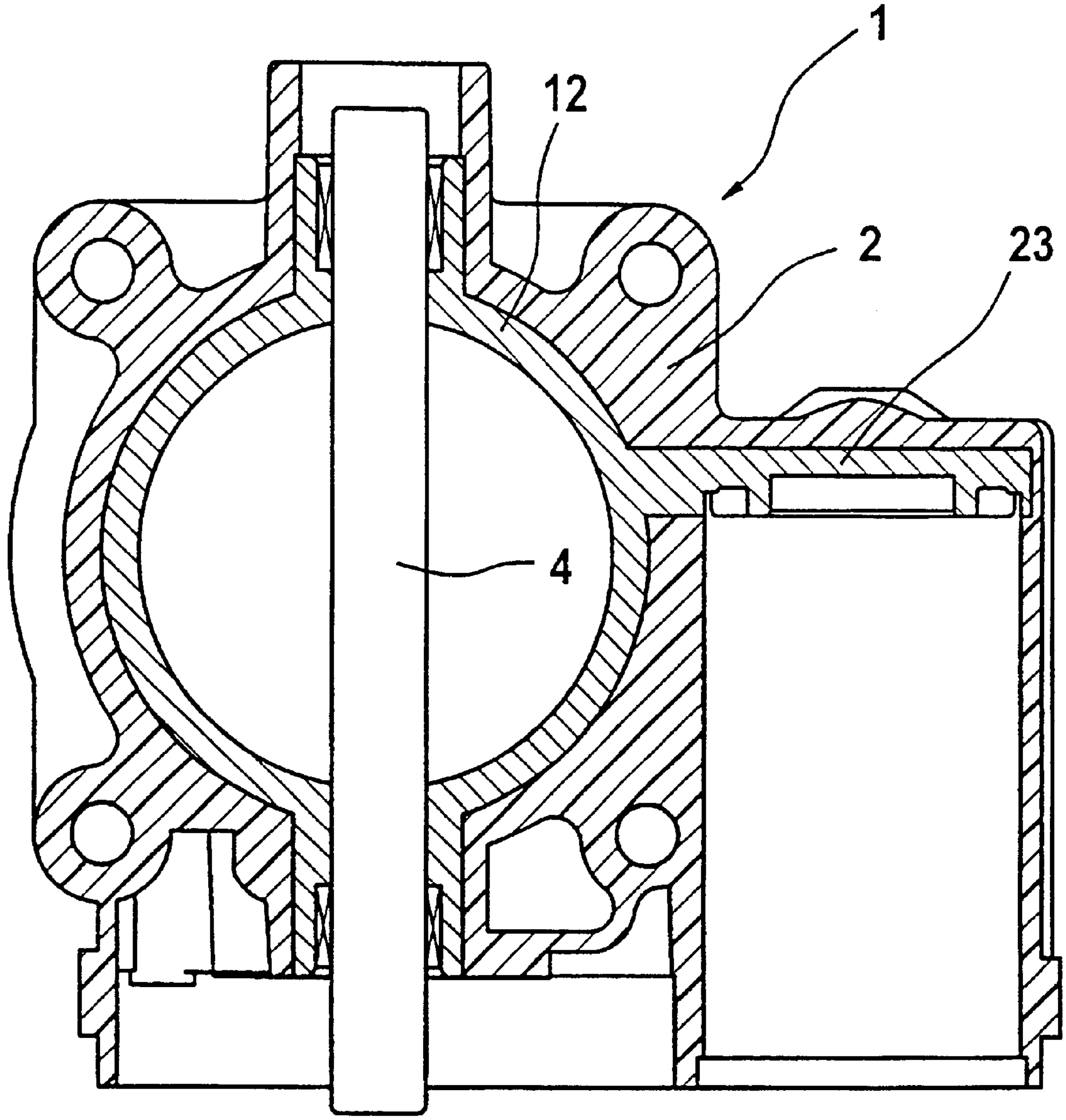
FIG. 6 shows the throttle body in section in a modified embodiment with respect to FIG. 1

FIG. 6 shows the throttle body 1 in section in a modified embodiment compared with FIG. 1, it being evident that the metal cylinder 12 not only accommodates the extensions 14 for holding the bearings 15, 19 for the throttle shaft 4 but also comprises an end shield 23 which holds one end of the actuating drive designed as an electric motor. This improves strength, and another advantage that may be mentioned is that heat losses which arise during the operation of the electric motor are transferred to the inner wall of the metal cylinder 12 via the end shield 23, the heat losses being dissipated at this location by the air (or fuel/air mixture) flowing through the conduit section 3. The end shield 23 thus also improves the thermal properties of the throttle body 1.

FIG. 7 shows the throttle body 1 of FIG. 1 in longitudinal section, the metal cylinder 12 here being shown with an inner contour. FIG. 7 once more clearly shows that the metal cylinder 12 is inserted into the plastic throttle housing in such a way or is surrounded by the plastic in such a way that the metal cylinder 12 is securely held in the throttle housing 2 while the inner wall of the metal cylinder 12 is not covered by plastic, i.e. the metallic properties are maintained. The throttle butterfly 5 can be pivoted out of the minimum position shown in FIG. 7, in which the conduit section 3 is completely or almost completely closed, by turning the throttle shaft 4 in one pivoting direction 24—clockwise as viewed in FIG. 7. The air (or fuel/air mixture) flowing through the conduit section 3 has a direction of flow 25. By pivoting the throttle butterfly 5 in the pivoting direction 24, the conduit section 3 is opened further as pivoting increases, allowing a characteristic curve of the volume flowing through the conduit section 3 to be set as a function of the opening angle of the throttle butterfly 5 by an inner contour 26 of the metal cylinder 12. By means of different inner contours 26, which can be achieved using different metal cylinders 12, it is thus possible in a simple manner to obtain different characteristic curves matched to the respective type of internal combustion engine while retaining a standardized throttle housing 2. The inner contour 26 of the metal cylinder 12 shown in FIG. 7 is symmetrical above and below the throttle shaft 4, the inner contour 26 initially having a right-cylindrical portion, followed by a circular-arc-shaped portion, in the pivoting direction 24, starting from the minimum position (or alternatively the zero position), shown in FIG. 7, of the throttle butterfly 5.

It is desirable that there should be no offset in the area of transition between the inner wall of the conduit section 3 and the inner wall of the metal cylinder 12 in order to avoid turbulence in the air or the fuel/air mixture in the direction of flow 25.

However, it is pointed out that the inner contour 26, shown in FIG. 7, of the metal cylinder 12 is only given by way of example and that any other contours (including contours which are asymmetrical above and below the plane of the throttle shaft 4) can be achieved in the production and/or machining of the metal cylinder 12.

List of reference numerals:

1. Throttle body
2. Throttle housing
3. Conduit section
4. Throttle shaft
5. Throttle butterfly
6. Gear housing
7. Actuator housing
8. Plug
9. Housing cover
10. Flange
11. Hole
12. Metal cylinder
13. Passage
14. Extension
15. Bearing
16. Space
17. Flat
18. Web
19. Bearing
20. Laser beam
21. Reaction bearing
22. Reaction bearing
23. End shield
24. Pivoting direction
25. Direction of flow
26. Inner contour

We claim:

1. A throttle body (1) comprising a throttle housing (2) made of plastic, a throttle butterfly (5) being pivotably mounted in a conduit section (3) of the throttle housing (2), and a metal cylinder (12) provided in the conduit section (3) over at least part of pivoting range of the throttle butterfly (5); wherein the plastic housing is thicker than the metal cylinder and the throttle body further comprises a holder, suitable for holding an additional element for the operation of the throttle butterfly at a location outside of the housing, and connecting means extending from the cylinder through the housing for connecting the holder to the cylinder.

2. The throttle body (1) as claimed in claim 1, wherein the metal cylinder (12) is included in the plastic of the throttle housing (2), a metal inner wall of the metal cylinder (12) being exposed in a region of the conduit section (3).

3. The throttle body (1) as claimed in claim 1, wherein the metal cylinder (12) is provided below and above a throttle shaft (4) carrying the throttle butterfly (5) in a direction of flow (25).

4. The throttle body (1) as claimed in claim 3, wherein the metal cylinder (12) is formed to hold bearings (15, 19) for the throttle shaft (4).

5. The throttle body (1) as claimed in claim 1, wherein the metal cylinder and the holder and the connecting means are constructed in a unitary form.

6. The throttle body (1) as claimed in claim 1, wherein the metal cylinder (12) has an inner contour (26) for obtaining a predeterminable characteristic curve for volume flow through the conduit section (3) as a function of pivoting of the throttle butterfly (5).

7. The throttle body (1) as claimed in claim 5, wherein the additional element is a throttle-valve potentiometer.

8. The throttle body (1) as claimed in claim 5, wherein the additional element is a drive motor.

9. A throttle body comprising:

a throttle housing made of plastic, and a throttle butterfly valve pivotally mounted in a conduit of the housing;

a holding element comprising a metal cylinder, a holder, and an arm extending radially outward from the cylinder to engage the holder;

wherein the cylinder is located within the housing on a surface of the conduit within a pivoting range of the valve;

the holder is located outside of the housing for holding a valve operating device; wherein the plastic housing is thicker than the metal cylinder; and the arm passes through the housing from the cylinder to the holder.

10. A throttle body according to claim 9, wherein the holding element is formed with unitary construction, and the valve operating device is a potentiometer.

11. A throttle body according to claim 9, wherein the holding element is formed with unitary construction, and the valve operating device is a motor.

12. A throttle body according to claim 9, further comprising an electric motor serving as said valve operating device, said motor being held by said holder and providing a function of moving the valve.

13. A throttle body according to claim 9, wherein the holding element is thermally conductive to provide a function of cooling the cylinder by conduction of heat from the cylinder to the holder.

* * * * *